United States Patent [19]

Church et al.

[11] Patent Number: 4,599,120
[45] Date of Patent: Jul. 8, 1986

[54] PROCESSING OF COPPER ALLOYS

[75] Inventors: Nathan L. Church, Chagrin Falls; W. Raymond Cribb, Mentor; John C. Harkness, Lakewood, all of Ohio

[73] Assignee: Brush Wellman Inc., Cleveland, Ohio

[21] Appl. No.: 704,608

[22] Filed: Feb. 25, 1985

[51] Int. Cl.⁴ ............................................. C22F 1/08
[52] U.S. Cl. .................................... 148/414; 420/485; 420/494
[58] Field of Search .............. 148/11.5 C, 12.7 C, 148/13.2, 160, 414, 435; 420/494, 485; 428/620; 357/70

[56] References Cited

U.S. PATENT DOCUMENTS

| 2,169,190 | 8/1969 | Kelly | 148/411 |
| 2,289,593 | 7/1942 | Sawyer et al. | 420/485 |
| 4,179,314 | 12/1979 | Wikle | 148/12.7 C |
| 4,377,424 | 3/1983 | Hirao et al. | 148/414 |
| 4,425,168 | 1/1984 | Goldstein et al. | 148/160 |

FOREIGN PATENT DOCUMENTS

| 5493 | 3/1965 | Japan | 420/485 |
| 112222 | 9/1978 | Japan | 420/494 |
| 122155 | 9/1981 | Japan | 357/70 |
| 61154 | 4/1984 | Japan | 357/70 |

OTHER PUBLICATIONS

Electronic Design 3, Feb. 1, 1977, "Some Answers About Inlay Clad Metals and the New Opportunities Open to Design Engineers", p. 11.

Primary Examiner—Wayland Stallard
Attorney, Agent, or Firm—Eugene J. Kalil; Ewan C. MacQueen

[57] ABSTRACT

This invention is directed to the treatment of copper beryllium alloys, and to articles and parts made therefrom, containing special small amounts of beryllium and nickel, e.g., about 0.05% to about 0.5% beryllium and about 0.05% to about 1% nickel where cobalt may be substituted for up to about one-half of said nickel content at a substitution ratio of about 1 part by weight cobalt for about 2 parts by weight nickel, which imparts to these alloys a superior combination of stress relaxation resistance, formability, ductility, conductivity and strength by the process of solution annealing, cold working at least about 50% or at least about 70% or 90% or more and age hardening.

5 Claims, 4 Drawing Figures

PROCESSING OF COPPER ALLOYS

The present invention is directed to a metallurgical process for wrought copper alloys, specifically alloys containing small interrelated amounts of beryllium and nickel, or nickel plus cobalt in combination, to produce useful articles having an improved combination of stress relaxation resistance, formability, conductivity and strength.

BACKGROUND OF THE INVENTION AND THE PRIOR ART

Copper beryllium alloys have been used commercially for approximately fifty years in applications requiring high strength, formability, stress relaxation resistance and conductivity. Historical development of copper beryllium alloys and the processes to manufacture them has generally proceeded in the direction of providing premium performance, i.e., the highest strengths, best ductilities and other highly desirable attributes, by taking advantage of the precipitation hardening characteristics of these alloys. Thus, U.S. Pat. Nos. 1,893,984, 1,957,214, 1,959,154, 1,974,839, 2,131,475, 2,166,794, 2,167,684, 2,172,639 and 2,289,593 disclose various wrought alloys containing varying amounts of beryllium and other elements. Commercial copper beryllium alloys include those wrought alloys bearing Copper Development Association designations C17500, C17510, C17000, C17200 and C17300.

In the fifty or so years since the above-discussed patents were granted, whole new industries have appeared and new sets of requirements have been imposed on alloy producers. Thus, the requirements of the electronics and computer industries were unknown in the 1930's. Even the trends toward miniaturization in electronics and computers have arisen and proceeded at an accelerating pace only in the past few years. In the provision of spring-type connectors and contacts, the complexity of the devices needed, and the requirements for heat dissipation, as well as for survival of parts at elevated temperatures without failure due to stress relaxation, have proceeded apace. In addition, purchasers have become increasingly price-conscious and connector alloys such as phosphor bronzes C51000 and C52100 have been employed due to cost even though the inferior performance of such alloys, such as in poorer conductivity, poorer formability and lower stress relaxation resistance as compared to copper beryllium alloys, was known. Moreover, the formability requirements imposed by the production of complex parts from strip or wire using progressive dies and other metal forming technologies, and the need for greater resistance to stress relaxation demanded by today's high reliability electrical and electronic connector, switch and relay applications, have elevated the difficulties imposed upon alloy suppliers as compared to the simpler days of U.S. Pat. Nos. 1,893,984 and 2,289,593 wherein the compositions and processing of copper beryllium alloys were intended only to obtain maximum strength-conductivity relationships, and no reference was made to considerations of formability or stress relaxation behavior.

Processes in the prior art to produce wrought forms (i.e., strip, plate, wire, rod, bar, tube, etc) of copper beryllium alloys have generally focused on the premium performance alloys with beryllium and major third element contents reminiscent of the composition of commercial alloys C17500, C17510 and C17200. These processes have generally included the steps of preparing the molten alloy, casting an ingot, converting the ingot to a wrought form by hot and/or cold working with optional intermediate anneals to maintain workability of the alloy, solution annealing the wrought form by heating to a temperature sufficient to effect recrystallization of the alloy and solid solution of the beryllium in the copper matrix and then rapidly quenching the alloy to retain the beryllium in supersaturated solid solution, optionally cold working the solution annealed wrought form a predetermined amount to enhance the subsequent age hardened strength, then age hardening the optionally cold worked wrought form at temperatures less than the solution annealing temperature to achieve desirable combinations of strength and ductility. This art is disclosed in U.S. Pat. Nos. 1,893,984, 1,959,154, 1,974,839, 1,975,113, 2,027,750, 2,527,983, 3,196,006, 3,138,493, 3,240,635, 4,179,314 and 4,425,168 which also teach that optimum solution annealing and aging temperature ranges are dependent upon alloy composition, and that age hardening may be performed either before, during or after the act of fabricating the solution annealed and optionally cold worked wrought form into an article of manufacture (e.g., an electrically conductive spring, pressure welding electrode, or similar device) by well-known metal forming technologies.

Copper-base alloys of the prior art which are not age hardenable (such as C51000 and C52100 phosphor bronzes) and which derive their strength solely from work hardening are frequently cold worked substantially beyond 50% reduction in area in order to achieve commercially significant strength levels. In the case of copper beryllium alloys of the prior art, final cold work applied between solution annealing and age hardening, other than that associated with any parts-fabrication metal forming operations, generally is confined to levels less than about 50% reduction. Thus, U.S. Pat. Nos. 3,138,493, 3,196,006, 4,179,314 and 4,425,168 describe processes involving a minimum of 3% to a maximum of 42% cold reduction prior to age hardening. One explanation of this restriction on cold work in the commercial copper beryllium alloys of the prior art is given in the 1982 publication "Wrought Beryllium Copper" by Brush Wellman Incorporated, which shows that as-rolled ductility (and hence formability—the minimum bend radius for no cracking when bent 90° or 180° in a forming operation) degrades to commercially unacceptable levels as pre-aging cold work increases beyond about 40% reduction, and that post-cold working age hardened strength exhibits a relative maximum at about 30% to 40% cold reduction, but decreases with larger amounts of cold work when the alloys are aged at commercially recommended times and temperatures.

Copending application Ser. No. 550,631 by Amitava Guha, assigned to Brush Wellman Inc., describes an improved process for commercial copper-beryllium-nickel alloy C17510 involving cold work of up to about 90% intermediate to a special high temperature solution annealing treatment to form a nickel-rich precipitate and a low temperature age hardening step, the whole intended to develop strength and electrical conductivity combinations previously unobtainable in C17500 and C17510, with little or no sacrifice in formability and resistance to stress relaxation. U.S. Pat. No. 2,289,593 also discloses copper-beryllium-nickel alloys cold worked in one instance as much as 80% prior to aging, but this is in reference to an alloy containing at least 1.47% Ni, and only electrical conductivity is reported.

The property of stress relaxation is an important design parameter which can give the designer assurance that a particular contact or connector or like device will maintain the required contact pressure to assure long-life performance of an assembly including the device. Stress relaxation is defined as the decrease of stress at constant strain with time for a given temperature. From a knowledge of the stress relaxation behavior of a material, a designer can determine how much the room temperature spring force must be increased to assure a particular minimum force at operating temperature to maintain electrical contact between mating parts for an extended time period.

The stronger beryllium-containing age hardenable alloys such as C17200, which contains about 2% beryllium, are known to have high resistance to stress relaxation. On the other hand, the considerably cheaper phosphor bronzes, such as C51000 and C52100, which are non-agehardenable and have to be severely cold worked to achieve high strength, are poor with respect to resistance to stress relaxation.

As used herein, stress relaxation resistance is determined by the test described in the paper entitled "Stress Relaxation of Beryllium Copper Strip in Bending" by Harkness and Lorenz presented at the 30th Annual Relay Conference, Stillwater, Okla., Apr. 27-28, 1982. In accordance with this test, flat spring specimens having a tapered gage length are stressed in a fixture to a constant initial stress level and are exposed with the fixture in the stressed condition to an elevated temperature such as 300° F. (150° C.) for an extended time period. Periodically, a specimen is removed and measured to determine the amount of permanent set the material has undergone, from which the percent of remaining stress value can be calculated.

Formability is determined by bending a flat strip specimen about a punch having a nose of variable known radius with failure being taken as the point at which cracking occurs in the outer fibers of the bend. A rating is given for the test from the quantity R/t wherein "R" is the radius of the smallest punch nose which causes no cracking and "t" is the thickness of the strip. The rating can be used by designers to determine whether a particular material can be formed to the geometry desired in a particular part.

The present invention provides a process to produce age hardenable copper beryllium alloys containing small amounts of nickel, where cobalt may be substituted for a portion of said nickel content, having a stress-relaxation resistance approaching that of the strongest copper beryllium alloys of commerce together with high formability and ductility, high conductivity and useful strength. Our copending application Ser. No. 623,463, "Processing of Copper Alloys", relates to a processing technique for copper beryllium alloys containing small amounts of cobalt.

SUMMARY OF THE INVENTION

Figure 1:
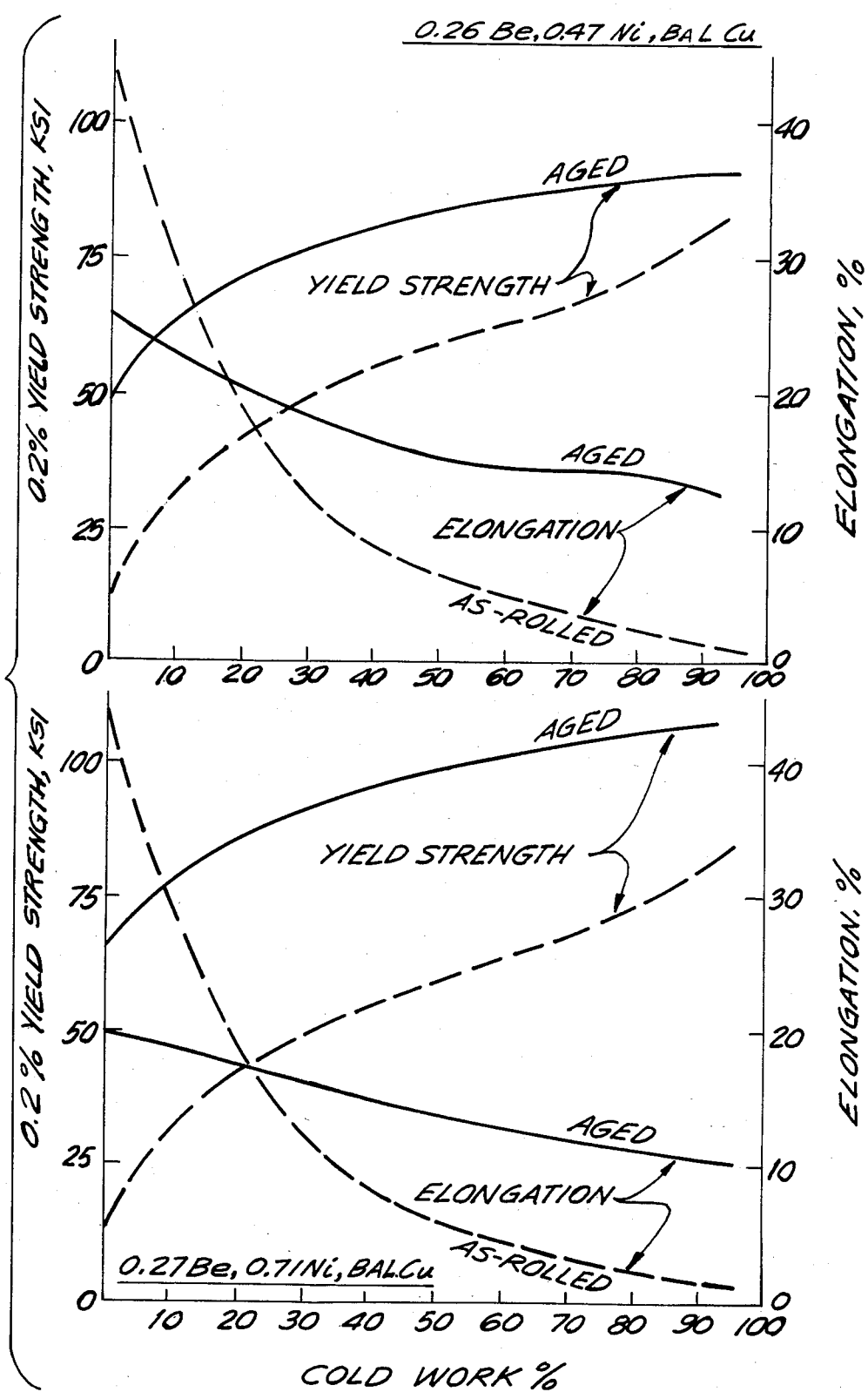
FIG. 1 depicts the influence of cold work from 0 to 93% reduction in area on the strength and ductility of strip made from two alloys within the range of the invention, one containing 0.26% beryllium, 0.47% nickel, balance essentially copper, the other containing 0.27% beryllium, 0.71% nickel, balance copper and both solution annealed at 1700° F. (925° C.), the properties being shown for both the as-rolled condition and after cold rolling plus age hardening 7 hrs. at 700° F. (370° C.)
Figure 2:
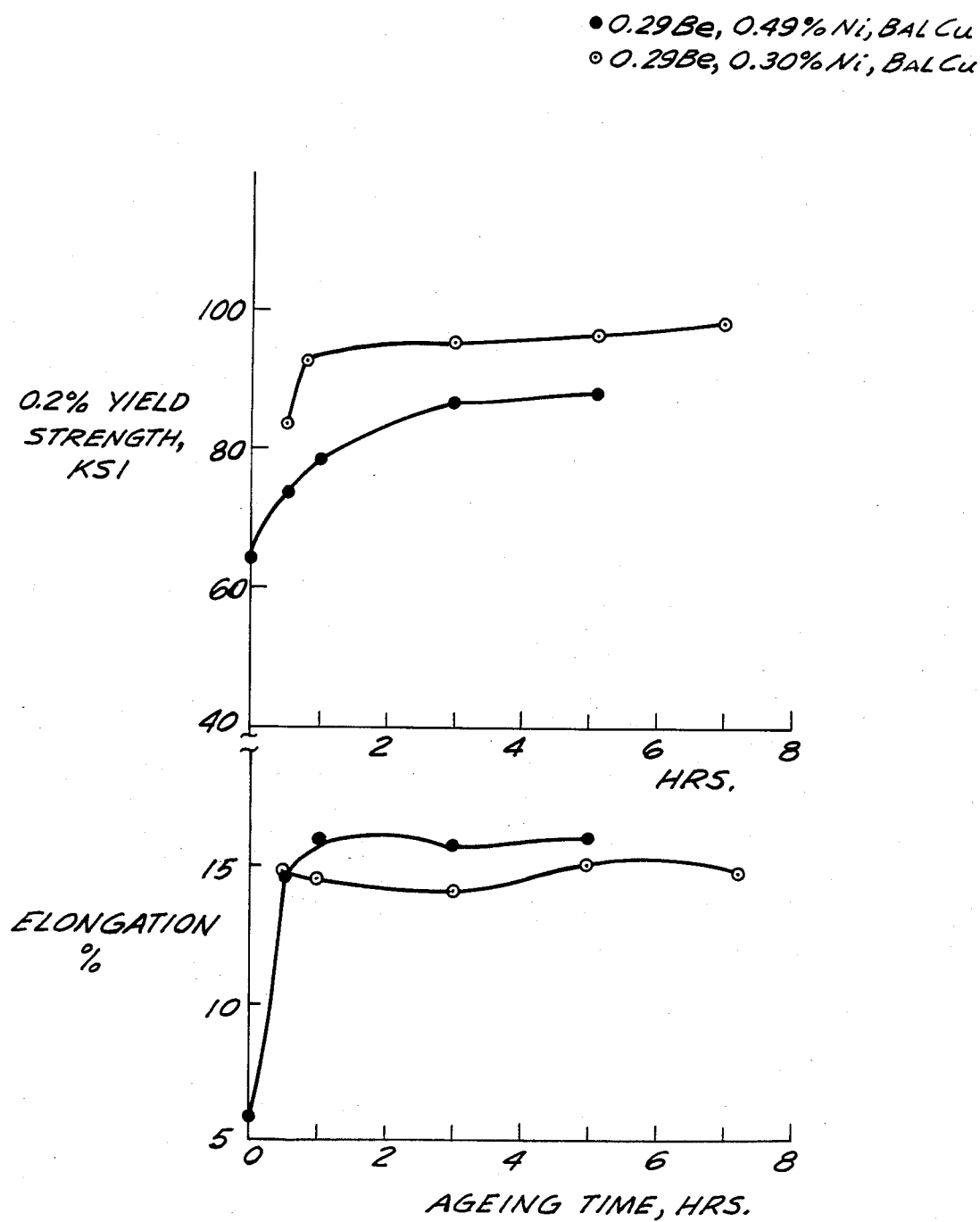
FIG. 2 depicts the yield strength and tensile elongation age hardening response of two alloys within the range of the invention, one containing 0.29% beryllium, 0.49% nickel, balance copper and the other containing 0.29% beryllium, 0.30% nickel, 0.16% cobalt, balance copper, after solution annealing at 1650° F. (900° C.), cold rolling 72% and age hardening at 750° F. (400° C.) for 0 to 7 hours.
Figure 3:
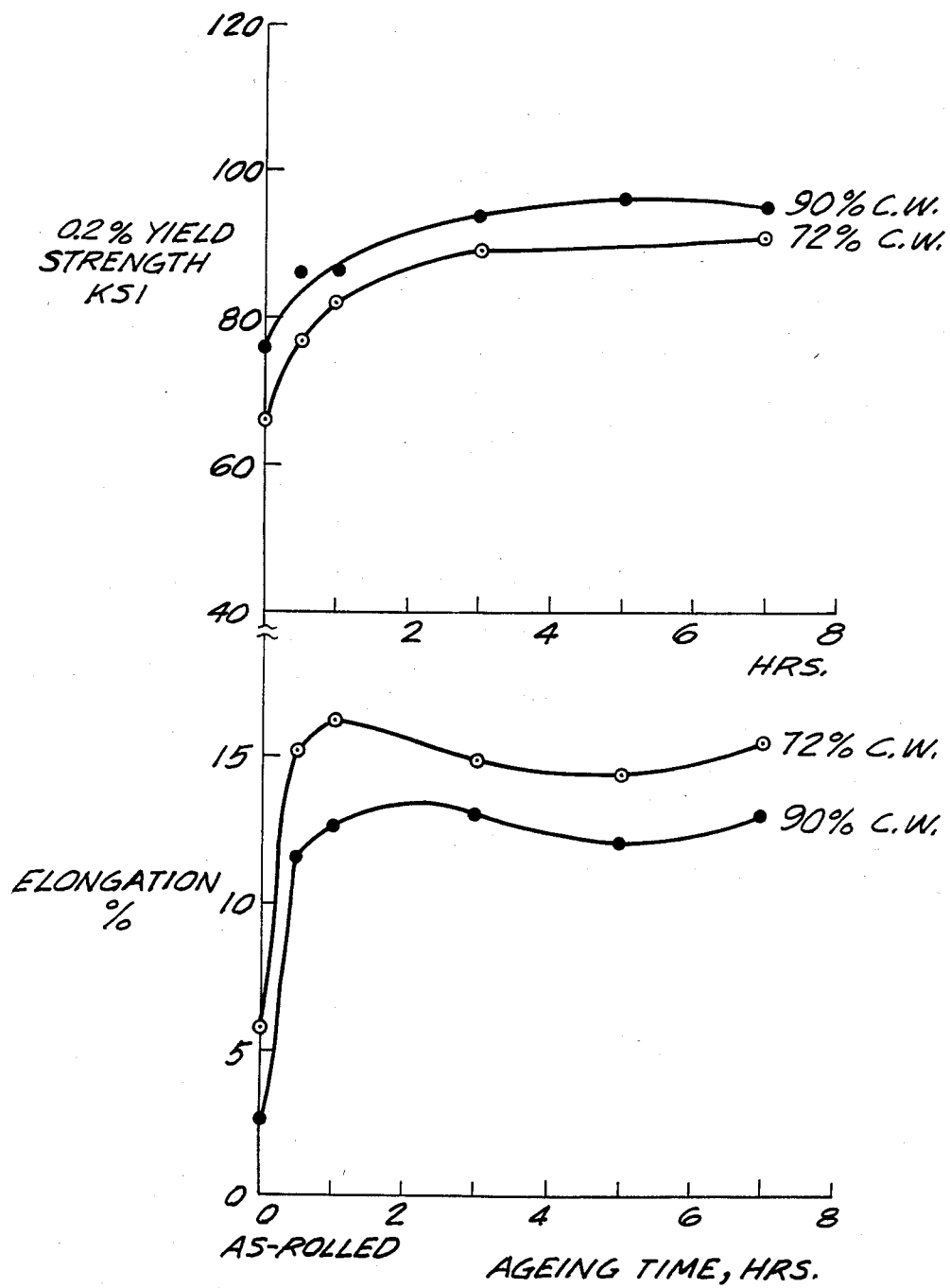
FIG. 3 depicts the yield strength and tensile elongation age hardening response of an alloy within the range of the invention containing 0.27% beryllium, 0.54% nickel, balance copper, after solution annealing at 1700° F. (925° C.), cold working either 72% or 90%, and age hardening at 750° F. (400° C.) for 0 to 7 hours.

The invention is directed to the treatment of copper beryllium alloys containing about 0.05% to about 0.5% beryllium and about 0.05% to about 1% nickel where cobalt may be substituted for up to about one-half of said nickel content at a substitution ratio of about 1 part by weight cobalt for 2 parts by weight nickel. The treatment consists of solution annealing said alloy in the temperature range of about 1600° F. (870° C.) to about 1850° F. (1000° C.), preferably about 1600° F. (870° C.) to about 1700° F. (930° C.), cold working said alloy to reduce the section thickness thereof by at least about 50%, preferably at least about 70% to about 95%, and aging said cold worked alloy in the temperature range of about 600° F. to about 1000° F. (315° C. to about 540° C.) for times of less than 1 to about 8 hrs. to provide in said aged alloy a high combination of stress relaxation resistance, formability, ductility, conductivity and strength.

DETAILED DESCRIPTION OF THE INVENTION

The invention is grounded in the discovery that beryllium copper alloys having small, definite contents of beryllium and of nickel, where a portion of said nickel content may be replaced with a definite amount of cobalt, are capable of providing highly useful combinations of stress relaxation resistance, formability and ductility, conductivity and strength when processed by solution annealing, heavy cold working and aging. Indeed, we have discovered that as these alloys are age hardened after cold working in excess of about 50% reduction in area, both strength, as measured by the 0.2% offset yield strength, and ductility, as measured by tensile elongation, improve considerably with increasing cold work up to about 95% reduction or more compared to aged material with cold work of less than 50%. The alloys contain about 0.05% to about 0.5% beryllium and about 0.05% to about 1% nickel where cobalt may be substituted for up to about one-half of said nickel content at a substitution ratio of about 1 parts by weight cobalt for 2 parts by weight cobalt, and the processing which is applied after any hot or cold working required to convert the original cast ingot to an intermediate shape of appropriate dimension, comprises a solution treatment in the temperature range of about 1600° F. (870° C.) to about 1850° F. (1000° C.), preferably about 1600° F. (870° C.) to about 1700° F. (930° C.), followed by cold working, as by rolling, to reduce the section of the intermediate shape by at least about 50% up to about 70% to about 95% or more followed by aging the resulting cold worked shape in the temperature range of about 600° F. to about 1000° F. (315° C. to about 540° C.) for less than about one hour to about 8 hours. The treatment differs from the commercial processing of copper beryllium alloys in the extent of cold work applied to the alloys prior to aging and differs from that of copending application Ser. No. 550,631 by Amitava Guha, assigned to Brush Wellman Inc., in the annealing temperatures employed and in the lack of formation of a nickel-rich precipitate at such annealing temperatures.

The treatment provides in the alloys, which are low in alloy constituents as compared to commercially produced wrought copper beryllium alloys, a useful and quite unexpected combination of properties. In particular, the alloys display a superior combination of stress relaxation resistance, formability and ductility and conductivity as compared to existing bronze and brass alloys, e.g., the phosphor bronzes, having similar strength.

The alloys may be cast to ingot using conventional static, semi-continuous or continuous casting techniques. The ingots may readily be worked, as by hot or cold rolling, without difficulty. Intermediate anneals at temperatures between about 1000° F. (540° C.) and 1750° F. (955° C.) may be employed. Once the ingot is reduced to the desired intermediate gage, from which cold reduction to desired final gage with a predetermined amount of cold work may be imposed, a solution anneal is employed. Solution annealing is accomplished at temperatures of about 1600° F. (870° C.) to about 700° F. (930° C.) to 1850° F. (1000° C.). Temperatures lower than this range will not effect complete recrystallization in some alloys. Temperatures at the low end of this range will give finer grain size and better formability but with poorer strength. There may be undesirable grain growth with some alloys within the cited range resulting from use of a 1750° F. (950° C.) or greater solution treatment. The solution-treated material is then cold worked to substantially finish gage, as by rolling, drawing or other metal deformation processes, to reduce the cross section thereof by at least about 50%, preferably at least about 70% to about 90% or more. The cold worked material is then aged at a temperature within the range of about 600° F. (315° C.) to about 1000° F. (540° C.), for less than about 1 to about 8 hours.

Aging acts as both a precipitation hardening and a stress-relieving heat treatment. The effect of aging is to increase strength while also greatly increasing ductility and resistance to stress relaxation of the alloy. Formability is also markedly increased. For aging temperatures below about 750° F. (400° C.) aging times of at least about 1 to about 7 hours are employed, while higher aging temperatures require about one hour or less aging time. Lower beryllium contents also require longer aging times than higher beryllium contents to achieve desirable property levels.

EXAMPLES WILL NOW BE GIVEN

A series of alloys having the compositions set forth in Table I was produced in ingot form. The ingots were converted to strip of intermediate gage by hot and cold rolling with optional intermediate anneals. The worked strip was then solution annealed at the temperatures shown in Table I for times of about 5 minutes or less at temperature, followed by a rapid quench to room temperature. The solution annealed strip was then cold rolled to 72% reduction in thickness and age hardened at the times and temperatures indicated. Tensile properties, hardness and conductivity were determined and are reported in the Table. For comparison, strip samples of Heats 4 and 5 processed as above through the 72% cold working operation but not age hardened exhibited as-rolled tensile properties of 65.5–67.3 ksi (450–460 MPa) ultimate tensile strength, 63.8–66.1 ksi (440–455 MPa) 0.2% yield strength, 5.2–5.6% elongation, a hardness of $R_B78$ and electrical conductivity of 43.9–44.1% IACS.

Table II contains the results obtained from strip made from certain alloys in Table I and an additional composition within the invention, processed as those of Table I except cold rolled 82% prior to age hardening as indicated.

Table III shows results for certain of the alloys from Tables I and II cold rolled 90% to 93% prior to aging as indicated and includes results of 90° bend formability tests and stress relaxation tests at 300° F. (150° C.) and an initial stress of 75% of the 0.2% offset yield strength. In this instance, sample strip of Heat 3 processed as shown through the 90% cold rolling operation but not age hardened exhibited as-rolled tensile properties of 79.0 ksi (545 MPa) ultimate tensile strength, 75.9 ksi (525 MPa) 0.2% yield strength, 2.5% elongation, a hardness of $R_B82$ and an electrical conductivity of 42.2% IACS. As-rolled longitudinal 90° bend formability (minimum R/t for no cracking) was zero.

In another example, an alloy containing 0.29% Be, 0.26% Co, balance copper, solution annealed at 1650° F. (900° C.), cold rolled 90% and aged 5 hours at 750° F. (400° C.) attained properties of 107 ksi (757 MPa) ultimate tensile strength, 98 ksi (676 MPa) 0.2% yield strength, 9% elongation, $R_B98$ hardness, 55% IACS electrical conductivity, miminum longitudinal 90° bend formability (R/t) of 1.5, and a "stress-remaining" value of 88% after 1000 hrs. at 300° F. (150° C.) and an initial stress of 75% of the 0.2% offset yield strength.

In yet another example, an alloy containing 0.30% beryllium, 0.49% cobalt, balance copper, solution annealed at 1700° F. (930° C.), cold rolled 90%, and aged 5 hours at 750° F. (400° C.) exhibited properties of 126 ksi (869 MPa) ultimate tensile strength, 120 ksi (827 MPa) 0.2% offset yield strength, 7% elongation, $R_B101$ hardness, 55% IACS electrical conductivity, and a minimum longitudinal 90° bend formability (R/t) of 0.6.

The role of the final aging treatment in improving the properties of these solution annealed and heavily cold rolled alloys is further demonstrated in FIG. 1 where an 11% improvement in strength and a 6-fold increase in ductility are observed in 90% or more cold rolled 0.26% beryllium, 0.47% nickel, balance copper strip upon aging at 700° F. (370° C.). Likewise, a 23% strength improvement and 5-fold ductility increase are observed in 90% or more cold rolled 0.27% beryllium, 0.71% nickel, balance copper strip upon aging at this same temperature.

Figure 4:
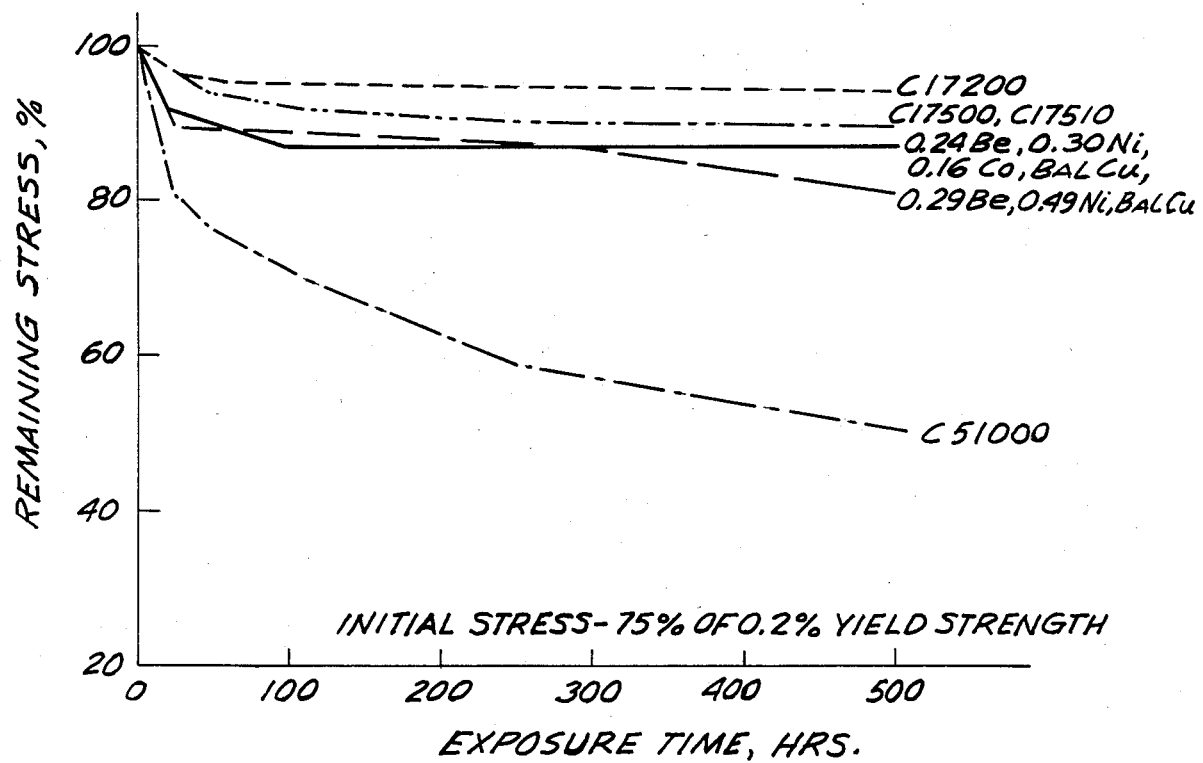
FIG. 4 depicts the stress relaxation curve at a temperature of 300° F. (150° C.) and an initial stress of 75% of the 0.2% offset yield strength for strip made from two alloys within the invention, one containing 0.29% beryllium, 0.49% nickel, balance copper and the other containing 0.29% beryllium, 0.30% nickel, 0.16% cobalt, balance copper, both solution annealed at 1650° F. (900° C.), cold rolled 90%, and aged 5 hrs. at 750° F. (400° C.). Copper-base alloys of the prior art, e.g., age hardened C17500, C17510 and C17200 and cold worked C52100, are provided for comparison.

As shown in FIG. 4, stress relaxation resistance of the annealed, heavily cold worked and aged alloys of the invention is similar to that of commercial C17500 and C17510 strip, approaches that of the higher strength precipitation hardened alloys of the prior art, e.g., C17200, and shows considerable improvement over the non-precipitation hardenable, cold worked alloys of the prior art, e.g., C51000 and C52100 having comparable strength.

Inspection of these examples reveals that at least about 0.15% to about 0.2% beryllium and about 0.2% nickel, balance copper are necessary to achieve desirable combinations of electrical conductivity exceeding about 40% IACS and strength exceeding about 70 ksi (480 MPa) 0.2% offset yield strength when processed per the invention, and that no significant improvement in strength beyond about 120 ksi (825 MPa), but a significant loss in electrical conductivity is obtained for beryllium content beyond about 0.5% and nickel content beyond about 0.9% to about 1%, balance copper, when processed per the invention. On the other hand, very high electrical conductivity exceeding about 60% IACS, with modest yield strengths of at least about 50 ksi (345 MPa) may be obtained from alloys with as little as 0.15% beryllium and 0.1% nickel, balance copper when processed according to the invention. It is further noted upon inspection of these examples that cobalt may be substituted for any portion of the nickel content of the alloys of this invention at an approximate substitution ratio of about 1 part by weight cobalt for about 2 parts by weight nickel and achieve reasonably comparable mechanical and physical properties at a given beryllium content.

Wrought forms processed in accordance with the invention are useful for current-carrying springs, mechanical springs, diaphragms, switch blades, contacts, connectors, terminals, fuse clips, bellows, die casting plunger tips, sleeve bearings, tooling to mold plastics, oil/coal drilling equipment components, resistance welding electrodes and components, lead frames, etc.

In addition to useful articles fabricated from alloy strip, plate, rod, bar and tube processed to finished form by the annealing, cold working and age hardening processes of the invention, we also recognize other approaches to the fabrication of such articles which lie within the scope of the invention. Thus clad, roll bonded, or inlaid strip or wire; wherein a layer of a first wrought metallic substance, e.g., a copper-base alloy, a nickel-base alloy, an iron-base alloy, a chromium-base alloy, a cobalt-base alloy, an aluminum-base alloy, a silver-base alloy, a gold-base alloy, a platinum-base alloy or a palladium-base alloy, or any combination of two or more of the above is metallurgically joined to a substrate of a second metallic substance consisting of a copper beryllium alloy within the range of the invention; may be fabricated by placing the layer or layers of said first metallic substance or substances in contact with the suitably cleaned surface of said solution annealed second metallic substance, cold rolling (or, in the case of wire, drawing) the superimposed metallic substances to a heavy reduction within the range of the invention, e.g., 50% to 70% or even 90% or more, to effect a cold weld, then age hardening the resultant multi-layered strip or wire within the range of the invention, e.g., 600° F. to 1000° F. (315° C. to 540° C.) for less than one hour to about 8 hours, to produce a desirable combination of strength, ductility, formability, conductivity and stress relaxation resistance in the substrate copper beryllium material.

Additionally, useful articles may be fabricated from alloys within the invention wherein the substantially final form of the article is produced by heavy cold working, e.g., cold forging, cold swaging, cold coining, or cold heading, the solution annealed and optionally partially cold rolled or drawn wrought alloy strip, plate, rod, bar, wire or forging blank to final dimensions to effect a total degree of cold work in the alloy within the range of the invention, e.g., 50% to about 70% or 90% or more, then age hardening the cold formed final article within the range of the invention, e.g., 600° F. to 1000° F. (315° C. to 540° C.) for less than one to about 8 hours, to impart to the final articles desirable property combinations of the alloys within the invention.

Although the present invention has been described in conjunction with preferred embodiments, it is to be understood that modifications and variations, may be resorted to without departing from the spirit and scope of the invention, as those skilled in the art will readily understand. Such modifications and variations are considered to be within the purview and scope of the invention and appended claims.

TABLE I

| Heat No. | Composition (Bal. Cu) | | | Anneal | | Age | | | Ultimate Tensile Strength | | 0.2% Yield Strength | | Elongation in 2 in. (50 mm) | Hardness | Electrical Conductivity | Minimum Longitudinal 90° Bend |
|---|---|---|---|---|---|---|---|---|---|---|---|---|---|---|---|---|
| | % Be | % Ni | % Co | F | C | F | C | Hr. | ksi | MPa | ksi | MPa | % | $R_B$ | % IACS | R/t |
| 1 | 0.19 | 0.96 | — | 1700 | 930 | 700 | 370 | 7 | 112.4 | 775 | 101.7 | 700 | 9.0 | 90 | 55.1 | 0.8 |
| 2 | 0.15 | 1.35 | — | 1850 | 1010 | 700 | 370 | 2 | 113.5 | 785 | 104.8 | 725 | 12.5 | 101 | 30.5 | — |
| 3 | 0.29 | 0.49 | — | 1700 | 930 | 700 | 370 | 7 | 105.9 | 730 | 93.3 | 640 | 11.2 | 87 | 53.2 | 0.9 |
| 4 | 0.27 | 0.54 | — | 1700 | 930 | 700 | 370 | 7 | 107.6 | 740 | 95.6 | 660 | 13.4 | 96 | 56.3 | — |
| 5 | 0.26 | 0.54 | — | 1750 | 955 | 700 | 370 | 7 | 104.1 | 715 | 90.4 | 620 | 16.3 | 97 | 55.8 | — |
| 6 | 0.26 | 0.71 | — | 1700 | 930 | 700 | 370 | 7 | 117.0 | 805 | 103.5 | 715 | 13.6 | 98 | 55.8 | — |
| 7 | 0.50 | 0.10 | — | 1650 | 900 | 700 | 370 | 3 | 79.8 | 550 | 66.6 | 460 | 15.4 | 85 | 42.8 | — |
| 8 | 0.50 | 0.13 | — | 1700 | 930 | 700 | 370 | 7 | 84.6 | 585 | 71.1 | 490 | 11.6 | 75 | 40.2 | 0.6 |
| 9 | 0.51 | 0.22 | — | 1700 | 930 | 750 | 400 | 3 | — | — | — | — | — | 92 | 41.0 | — |
| 10 | 0.49 | 0.96 | — | 1700 | 930 | 700 | 370 | 7 | 131.0 | 900 | 118.9 | 820 | 12.2 | 95 | 42.4 | 0.8 |
| 10 | 0.49 | 0.96 | — | 1750 | 955 | 750 | 400 | 7 | 129.0 | 890 | 115.5 | 795 | 14.6 | 103 | 45.1 | — |
| 11 | 0.71 | 0.14 | — | 1700 | 930 | 750 | 400 | 3 | — | — | — | — | — | 89 | 36.0 | — |
| 12 | 0.70 | 0.23 | — | 1700 | 930 | 700 | 370 | 3 | 101.8 | 700 | 86.8 | 595 | 12.6 | 90 | 35.7 | 0.4 |
| 13 | 0.30 | 0.11 | 0.10 | 1700 | 930 | 750 | 400 | 3 | — | — | — | — | — | 90 | 49.0 | — |
| 14 | 0.29 | 0.30 | 0.16 | 1700 | 930 | 700 | 370 | 7 | 112.3 | 770 | 102.2 | 705 | 10.2 | 87 | 52.0 | 0.8 |
| 15 | 0.39 | 0.11 | 0.10 | 1650 | 900 | 750 | 400 | 3 | — | — | — | — | — | 94 | 44.8 | — |
| 16 | 0.52 | 0.11 | 0.08 | 1700 | 930 | 750 | 400 | 3 | — | — | — | — | — | 97 | 38.5 | — |

TABLE II

| Heat No. | Composition (Bal. Cu) % Be | % Ni | % Co | Anneal F | C | Age F | C | Hr. | Ultimate Tensile Strength ksi | MPa | 0.2% Yield Strength ksi | MPa | Elongation in 2 in. (50 mm) % | Hardness $R_B$ | Electrical Conductivity % IACS | Minimum Longitudinal 90° Bend R/t |
|---|---|---|---|---|---|---|---|---|---|---|---|---|---|---|---|---|
| 17 | 0.19 | 0.10 | — | 1700 | 930 | 700 | 370 | 7 | 70.0 | 480 | 63.3 | 435 | 6.7 | 72 | 61.1 | 0.6 |
| 3 | 0.29 | 0.49 | — | 1700 | 930 | 700 | 370 | 7 | 107.4 | 740 | 96.4 | 665 | 9.9 | 87 | 54.6 | 0.4 |
| 7 | 0.50 | 0.10 | — | 1700 | 930 | 700 | 370 | 7 | 80.7 | 555 | 66.9 | 460 | 13.4 | 83 | 43.8 | 0.6 |
| 10 | 0.49 | 0.96 | — | 1700 | 930 | 700 | 370 | 7 | 132.1 | 910 | 121.4 | 835 | 8.5 | 99 | 44.1 | 0.6 |

TABLE III

| Heat No. | Composition (Bal. Cu) % Be | % Ni | % Co | Anneal F | C | Age F | C | Hr. | Ultimate Tensile Strength ksi | MPa | 0.2% Yield Strength ksi | MPa |
|---|---|---|---|---|---|---|---|---|---|---|---|---|
| 17 | 0.19 | 0.10 | — | 1750 | 950 | 800 | 425 | 3 | 59.7 | 410 | 46.8 | 320 |
| 1 | 0.19 | 0.96 | — | 1650 | 900 | 700 | 370 | 7 | 107.0 | 735 | 99.4 | 685 |
| 3 | 0.27 | 0.54 | — | 1700 | 930 | 700 | 370 | 7 | 111.2 | 765 | 94.2 | 650 |
| 5 | 0.29 | 0.49 | — | 1650 | 900 | 750 | 400 | 5 | — | — | 93.3 | 645 |
| 6 | 0.26 | 0.71 | — | 1700 | 930 | 700 | 370 | 7 | 117.5 | 810 | 107.1 | 740 |
| 10 | 0.49 | 0.96 | — | 1650 | 900 | 800 | 425 | 5 | 89.4 | 615 | 77.4 | 530 |
| 14 | 0.29 | 0.30 | 0.16 | 1650 | 900 | 700 | 370 | 7 | 115.1 | 790 | 106.3 | 730 |
| 14 | 0.29 | 0.30 | 0.16 | 1650 | 900 | 750 | 400 | 5 | — | — | 104.2 | 715 |

| Heat No. | Elongation in 2 in. (50 mm) % | Hardness $R_B$ | Electrical Conductivity % IACS | Minimum Longitudinal 90° Bend R/t | % Remaining Stress 300 F. (150 C.) 500 hr. |
|---|---|---|---|---|---|
| 17 | 15.5 | 29 | 65.8 | 0 | — |
| 1 | 9.6 | 81 | 56.8 | 1.0 | — |
| 3 | 13.1 | 96 | 55.1 | 0 | — |
| 5 | — | — | — | — | 88.8 |
| 6 | 10.5 | 97 | 56.0 | 0.4 | — |
| 10 | 16.3 | 69 | 50.6 | 0.5 | — |
| 14 | 10.8 | 94 | 53.7 | 0.2 | — |
| 14 | — | — | — | — | 87.0 |

What is claimed is:

1. An article made from wrought copper-beryllium alloy material consisting essentially of about 0.05% to about 0.5% beryllium, about 0.05% to about 1% nickel where cobalt may be substituted for up to one-half of said nickel content at a substitution ratio of about 1 part by weight cobalt for about 2 parts by weight nickel, and the balance essentially copper by solution treating said alloy in wrought intermediate form at a temperature between about 1600° F. (870° C.) and about 1850° F. (1000° C.) for a time sufficient to effect recrystallization and solid solution of that portion of the alloying elements capable of contributing to precipitation hardening, subjecting said solution treated alloy to a final cold reduction of at least about 50% and aging said cold worked alloy at a temperature in the range of about 600° F. (315° C.) to about 1000° F. (540° C.) for less than one to about 8 hours to effect precipitation hardening with accompanying substantial increase in stress relaxation resistance, formability, ductility, conductivity and strength.

2. An article in accordance with claim 1 wherein said copper-beryllium alloy material consists essentially of at least about 0.15% beryllium and at least 0.2% nickel and has in said cold reduced and aged condition a "stress-remaining" value of at least about 80% in the stress relaxation test for 500 hours at 300° F. (150° C.) and an initial stress of 75% of the 0.2% offset yield strength, a yield strength (0.2% offset) of at least about 70 ksi (480 MPa) to about 120 ksi (900 MPa), a formability value R/t of no more than 3.5 longitudinal and no more than about 9.0 transverse, and a conductivity of at least about 35% I.A.C.S.

3. An article in accordance with claim 1 comprising a contact element characterized in use by high resistance to stress relaxation upon exposure to temperatures up to about 300° F. (150° C.).

4. An article in accordance with claim 1 comprising a lead frame or similar device made from material consisting essentially of no more than about 0.2% beryllium and no more than about 0.2% nickel and characterized by an electrical conductivity exceeding about 60% IACS and an 0.2% offset yield strength of at least about 50 ksi (345 MPa).

5. An article in accordance with claim 1 in the form of at least one shape from the group consisting of strip, wire, rod, bar and tubing, said shape being made of an alloy having a beryllium content of about 0.2% to about 0.5% and a nickel content of about 0.2% to about 1%.

* * * * *